(12) United States Patent
Chou et al.

(10) Patent No.: US 9,507,708 B2
(45) Date of Patent: Nov. 29, 2016

(54) METHOD FOR MANAGING MEMORY APPARATUS, ASSOCIATED MEMORY APPARATUS THEREOF AND ASSOCIATED CONTROLLER THEREOF

(71) Applicant: Silicon Motion Inc., Hsinchu County (TW)

(72) Inventors: Po-Sheng Chou, Miaoli County (TW); Yu-Wei Fan, Taoyuan County (TW); Chung-Yuan Chan, Taichung (TW)

(73) Assignee: Silicon Motion Inc., Hsinchu County (TW)

( * ) Notice: Subject to any disclaimer, the term of this patent is extended or adjusted under 35 U.S.C. 154(b) by 87 days.

(21) Appl. No.: 14/335,939

(22) Filed: Jul. 20, 2014

(65) Prior Publication Data

US 2015/0039811 A1 Feb. 5, 2015

Related U.S. Application Data

(60) Provisional application No. 61/862,094, filed on Aug. 5, 2013.

(30) Foreign Application Priority Data

Dec. 6, 2013 (TW) .............................. 102144911 A

(51) Int. Cl.
*G06F 12/02* (2006.01)
(52) U.S. Cl.
CPC ... *G06F 12/0246* (2013.01); *G06F 2212/7202* (2013.01)
(58) Field of Classification Search
CPC ........... G06F 12/0246; G06F 12/0868; G06F 2212/214; G06F 2212/7203
See application file for complete search history.

(56) References Cited

U.S. PATENT DOCUMENTS

| 7,962,685 | B2 | 6/2011 | Cheung et al. |
| 8,040,744 | B2 | 10/2011 | Gorobets |
| 9,134,924 | B2 | 9/2015 | Yano et al. |
| 2009/0300269 | A1 | 12/2009 | Radke |
| 2010/0023682 | A1 | 1/2010 | Lee |
| 2010/0042773 | A1* | 2/2010 | Yeh ..................... G06F 12/0804 711/103 |
| 2010/0115192 | A1 | 5/2010 | Lee |

(Continued)

FOREIGN PATENT DOCUMENTS

| JP | 2010250846 A | 11/2010 |
| KR | 1020080091203 A | 10/2008 |
| KR | 1020130010447 A | 1/2013 |
| TW | 201030521 | 8/2010 |
| TW | 201035757 | 10/2010 |

*Primary Examiner* — Ryan Bertram
(74) *Attorney, Agent, or Firm* — Winston Hsu; Scott Margo

(57) ABSTRACT

A method for managing a memory apparatus and the associated memory apparatus thereof and the associated controller thereof are provided, where the method includes: temporarily storing data received from a host device into a volatile memory in the controller and utilizing the data in the volatile memory as received data, and dynamically monitoring the data amount of the received data to determine whether to immediately write the received data into at least one NV memory element; and when a specific signal is received and it is detected that specific data having not been written into a same location in a specific block configured to be an MLC memory block within a specific NV memory element of the at least one NV memory element for a predetermined number of times exists in the received data, immediately writing the specific data into another block in the at least one NV memory element.

20 Claims, 10 Drawing Sheets

(56) References Cited

U.S. PATENT DOCUMENTS

| | | |
|---|---|---|
| 2010/0174847 A1 | 7/2010 | Paley |
| 2011/0041005 A1 | 2/2011 | Selinger |
| 2012/0246391 A1 | 9/2012 | Meir |
| 2012/0254574 A1 | 10/2012 | Sinclair |
| 2012/0311245 A1* | 12/2012 | Yano ............... G06F 12/0246 711/103 |
| 2013/0173844 A1 | 7/2013 | Chen |

* cited by examiner

METHOD FOR MANAGING MEMORY APPARATUS, ASSOCIATED MEMORY APPARATUS THEREOF AND ASSOCIATED CONTROLLER THEREOF

CROSS REFERENCE TO RELATED APPLICATIONS

This application claims the benefit of U.S. provisional application No. 61/862,094 filed on Aug. 5, 2013 and incorporated herein by reference.

BACKGROUND OF THE INVENTION

1. Field of the Invention

The present invention relates to the control of the flash memory, and more particularly, to a method for managing a memory apparatus, and the associated memory apparatus and controller thereof.

2. Description of the Prior Art

Due to the development of the flash memory techniques, various portable memory apparatuses (e.g., memory cards which meet the SD/MMC, CF, MS and XD specifications) are widely implemented for various applications. Hence, the access control of the flash memories in these portable memory apparatuses has become an important issue.

For example, commonly used NAND flash memories may be categorized in two types, the single level cell (SLC) flash memories and the multiple level cell (MLC) flash memories. Each transistor used as a memory cell in the SLC flash memory has only two charge values which are represented in logic values 0 and 1. Further, the storage capacity of each transistor used as a memory cell in the MLC flash memory is fully utilized, and the transistor of the MLC flash memory is driven by a higher voltage, to record multiple bits information (e.g., 00, 01, 11 and 10) in one transistor through various levels of voltages. Theoretically, the recording density of the MLC flash memory may exceed two times the recording density of the SLC flash memory. This is good news to related industries having difficulties in developing NAND flash memories.

Compared with the SLC flash memory, the cost of manufacturing the MLC flash memory is cheaper, and the MLC flash memory is capable of providing a larger capacity in a limited space. Hence, the MLC flash memory is widely applied to various portable memory apparatuses in the market. According to a related art technique, since the operations of some types of MLC flash memories are complicated, a traditional memory controller configures a portion of physical blocks in an MLC flash memory to serve as SLC memory blocks, for receiving the write data from a host device. However, some problems are thereby generated. For example, since a portion of physical blocks in the MLC flash memory is configured as SLC memory blocks, the amount of physical blocks of the MLC flash memory which may be used as MLC memory blocks are fewer. For another example, the traditional memory controller temporarily writes the received data into SLC memory blocks first, and then collects data to the MLC memory blocks from the SLC memory blocks, wherein the storage space of these SLC memory blocks may easily run out. Hence, the work load of the memory controller is greatly increased. Therefore, there is a need of a novel method for enhancing the control of the data access of the flash memories, to raise the overall performance without introducing side effects (e.g., errors of stored data).

SUMMARY OF THE INVENTION

Hence, an objective of the present invention is to provide a method for managing a memory apparatus and the associated memory apparatus and controller, to solve aforementioned problems.

Another objective of the present invention is to provide a method for managing a memory apparatus and the associated memory apparatus and controller, to raise the operation performance of the memory apparatus.

According to at least one preferred embodiment of the present invention, a method for managing a memory apparatus is provided. The memory apparatus includes at least one non-volatile (NV) memory element, and each of the at least one NV memory element includes a plurality of blocks. The method is applied to a controller of the memory apparatus, and the controller is arranged to control the at least one NV memory element. The method includes the following steps: temporarily storing data received from a host device into a volatile memory in the controller and utilizing the data in the volatile memory as received data, and dynamically monitoring the data amount of the received data to determine whether to immediately write the received data into at least one NV memory element, wherein at least one write command received from the host device indicates that the host device demands to write the data; and when a specific signal is received and it is detected that specific data having not been written into a same location in a specific block configured to be a multiple level cell (MLC) memory block within a specific NV memory element of the at least one NV memory element for a predetermined number of times exists in the received data, immediately writing the specific data into another block in the at least one NV memory element, to prevent the specific data from being lost, wherein the specific signal indicates that power of the controller is abnormal or the memory apparatus is going to be powered off, the predetermined number of times is larger than 1, and the other block is configured as a single level cell (SLC) memory block.

Besides providing the above method, the present invention also provides a memory apparatus including at least one non-volatile (NV) memory element and a controller. Each of the at least one NV memory element includes a plurality of blocks. The controller is used for controlling the at least one NV element. The controller includes a processing unit, arranged for managing the memory apparatus according to a program code embedded in the processing unit or received from outside of the processing unit, wherein the controller temporarily stores data received from a host device into a volatile memory in the controller and utilizing the data in the volatile memory as received data, and dynamically monitors the data amount of the received data to determine whether to immediately write the received data into the at least one NV memory element, wherein at least one write command received from the host device indicates that the host device demands to write the data. When a specific signal is received and it is detected that specific data having not been written into a same location in a specific block configured to be a multiple level cell (MLC) memory block within a specific NV memory element of the at least one NV memory element for a predetermined number of times exists in the received data, the controller immediately writes the specific data into another block in the at least one NV memory element, to prevent the specific data from being lost, wherein the specific signal indicates that power of the controller is abnormal or the memory apparatus is going to be powered off, the predetermined number of times is larger than 1, and the other block is configured as a single level cell (SLC) memory block.

Besides providing the above method and memory apparatus, the present invention also provides a controller of a memory apparatus. The memory apparatus includes at least one non-volatile (NV) memory element, each of the at least one NV memory element includes a plurality of blocks. The controller includes a processing unit. The processing unit is arranged for managing the memory apparatus according to a program code embedded in the processing unit or received from outside of the processing unit, wherein the controller temporarily stores data received from a host device into a volatile memory in the controller and utilizes the data in the volatile memory as received data, and dynamically monitors the data amount of the received data to determine whether to immediately write the received data into the at least one NV memory element, wherein at least one write command received from the host device indicates that the host device demands to write the data. When a specific signal is received and it is detected that specific data having not been written into a same location in a specific block configured to be a multiple level cell (MLC) memory block within a specific NV memory element of the at least one NV memory element for a predetermined number of times exists in the received data, the controller immediately writes the specific data into another block in the at least one NV memory element, to prevent the specific data from being lost, wherein the specific signal indicates that power of the controller is abnormal or the memory apparatus is going to be powered off, the predetermined number of times is larger than 1, and the other block is configured as a single level cell (SLC) memory block.

An advantage provided by the present invention is that, compared with related arts, the methods, memory apparatuses and controllers of the present invention does not need to a plenty of SLC memory blocks, thus saving the storage space occupied by the SLC memory blocks, so as to provide more MLC memory blocks.

Another advantage provided by the present invention is that, compared with related arts, the methods, memory apparatuses and controllers of the present invention may improve the overall performance without introducing side effects (e.g., errors of stored data). More particularly, the methods, memory apparatuses and controllers of the present invention may save the time of temporarily writing the received data into the aforementioned plenty of SLC memory blocks and then collecting the data from the aforementioned SLC memory blocks to the MLC memory blocks, and may save the time of frequently erasing the aforementioned SLC memory blocks. Hence, compared with related arts, the present invention provides better performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
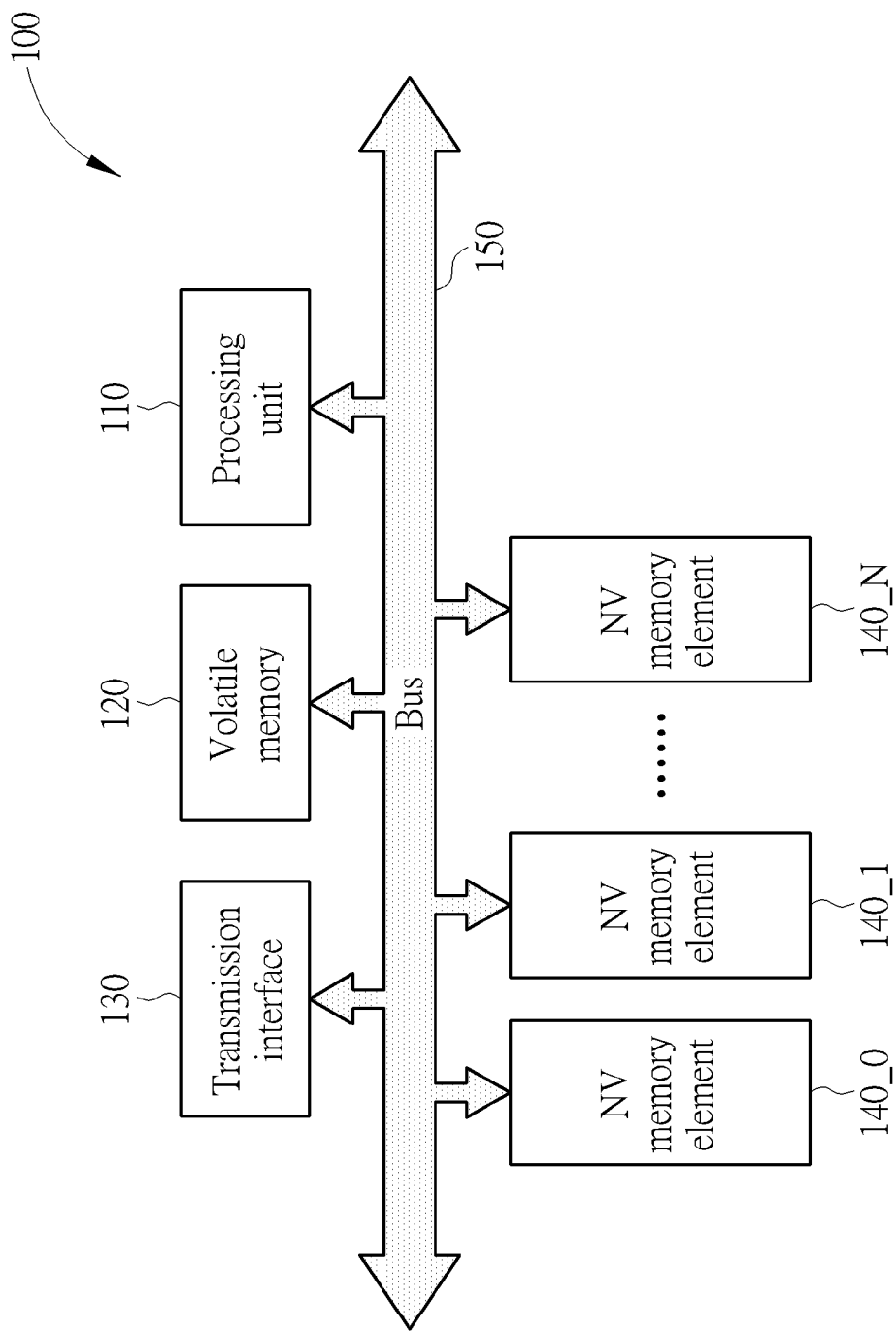
FIG. 1 is a diagram illustrating a memory apparatus according to a first embodiment of the present invention.

Please refer to FIG. 1, which is a diagram illustrating a memory apparatus 100 according to a first embodiment of the present invention. The memory apparatus 100 includes a processing unit 110, a volatile memory 120, a transmission interface 130, a plurality of non-volatile (NV) memory elements 140_1, 140_2, . . . , 140_N (the symbol N represents a positive integer), and a bus 150. In typical conditions, after the transmission interface 130 is coupled to a host device (not shown in FIG. 1), the host device may access the memory apparatus 100 through the transmission interface 130. For example, the host device may be a personal computer such as a laptop computer or a desktop computer.

The processing unit 110 may manage the memory apparatus 100 according to a program code embedded therein or received from outside of the processing unit 110. For example, the program code may be a hardware code embedded in the processing unit 110, and more particularly, a read-only memory code (ROM code). For another example, the program code may be a firmware code received from outside of the processing unit 110. Specifically, the processing unit 110 is used to control the volatile memory 120, the transmission interface 130, the NV memory element 140_1, 140_2, . . . , 140_N and the bus 150. The processing unit 110 in this embodiment may be an advanced reduced instruction set computer machine (Advanced RISC Machine, ARM) processor or an Argonaut RISC Core (ARC) processor. However, this is merely for illustrative purpose, not a limitation to the present invention. According to a modification of this embodiment, the processing unit 110 may be other type of processor.

Further, the volatile memory 120 may be used to store a global page address linking table, the data accessed by the host device, and other information required for accessing the memory apparatus 100. In this embodiment, the volatile memory 120 may be a dynamic random access memory (DRAM). However, this is merely for illustrative purpose, not a limitation to the present invention. According to a modification of this embodiment, the volatile memory 120 may be other type of volatile memory. For example, the volatile memory 120 may include a static random access memory (SRAM).

According to this embodiment, the transmission interface 130 shown in FIG. 1 is used to transmit commands between the host device and the memory apparatus 100, wherein the transmission interface 130 meets a specific communication specification such as the serial advanced technology attachment (SATA) specification, the parallel advanced technology attachment (PATA) specification or the universal serial bus (USB) specification. For example, the memory apparatus 100 is an SSD arranged in the host device, and the specific communication specification may be one of typical communication specifications for implementing inner communications in the host device, such as the SATA and PATA specifications. For another example, the memory apparatus 100 is an SSD arranged outside of the host device, and the specific communication specification may be used to implement some typical communication specifications performed outside of the host device, such as the USB specification. However, this is merely for illustrative purpose, not a limitation to the present invention. According to a modification of this embodiment, the memory apparatus 100 may be a portable memory apparatus such as a memory card, and the specific communication may be used to implement some typical communications of the input\output interfaces of a memory card, such as the secure digital (SD) specification or the compact flash (CF) specification.

Moreover, the NV memory elements 140_1, 140_2, ..., 140_N may be used to store data, wherein the NV memory elements 140_1, 140_2, ..., 140_N may be (but are not limited to) NAND flash chips. The bus 150 is used to couple the processing unit 110, the volatile memory 120, the transmission interface 130, and the NV memory elements 140_1, 140_2, ..., 140_N, and used for implementing communications of these elements. In this embodiment, all of the elements in the structure of FIG. 1, except the NV memory elements 140_1, 140_2, ..., 140_N, may be integrated as a controller, especially an integrated circuit (IC) such as a controller chip, wherein the controller is used to control at least one NV memory element in the memory apparatus 100 such as the NV memory elements 140_1, 140_2, ..., 140_N, and may be viewed as the controller of the memory apparatus 100.

Figure 2:
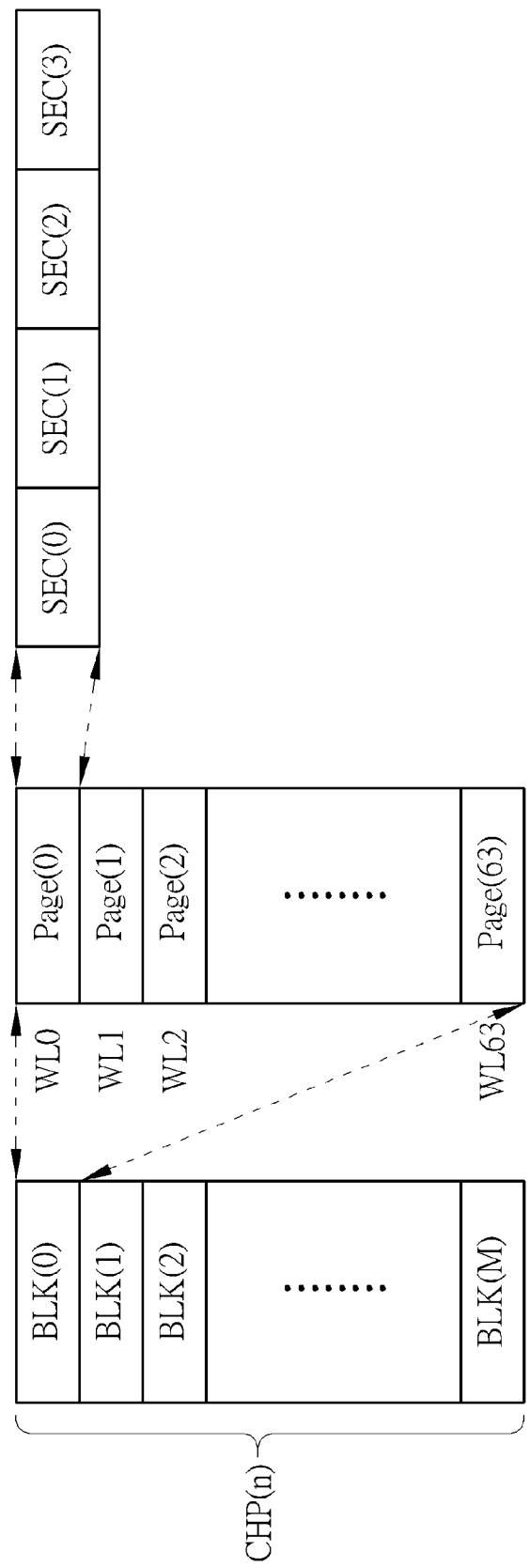
FIG. 2 depicts a content arrangement of one of the NV memory elements, wherein the NV memory element is a flash chip in this embodiment.

Please refer to FIG. 2, which depicts a content arrangement of an NV memory element 140_n of the NV memory elements 140_1, 140_2, ..., 140_N, wherein the NV memory element 140_n may be a flash chip CHP(n) in this embodiment, and the index n may represent any integer within the range [0, N]. As shown in FIG. 2, each NV memory element of the NV memory elements 140_1, 140_2, ..., 140_N, such as the flash chip DNP(n), may include a plurality of blocks such as the blocks BLK(0), BLK(1), BLK(2), ..., BLK(M) (the symbol M represents a positive integer), wherein each block includes a plurality of pages each having a plurality of sectors. In this embodiment, one sector may be chosen as the smallest read unit. In other words, during one read operation, the processing unit 110 may read a sector or a plurality of sectors. However, this is merely for illustrative purpose, not a limitation to the present invention.

As shown in FIG. 2, a block (e.g. the block BLK(0)) in the NV memory element 140_n such as the flash chip CHP(n) is configured as a single level cell (SLC) memory block, and the block such as the block BLK(0) may include a predetermined number of pages, such as pages Page (0), Page(1), Page(2), ..., Page(63) corresponding to the word-lines WL0, WL1, WL2, ..., WL63, respectively, wherein each page such as Page(0) may include a plurality of sectors SEC(0), SEC(1), SEC(2), ..., SEC(3). However, this is merely for illustrative purpose, not a limitation to the present invention. According to a modification of this embodiment, such as the embodiment shown in FIG. 3, under the situation that a block (e.g. the block BLK(0)) in the NV memory element 140_n (e.g. the flash chip CHP (n)) is configured as a multiple level cell (MLC) memory block (e.g. a triple level cell (TLC) memory block), the block (e.g. the block BLK (0)) may include a predetermined number of pages, such as the sets of pages {Page (0), Page (1), Page (2)}, {Page(3), Page(4), Page(5)}, {Page(6), Page(7), Page(8)}, ..., {Page(189), Page(190), Page(191)}, wherein each page such as the page Page(0) may include sectors SEC(0), SEC(1), SEC(2) and SEC(3).

Please note that, the storage capacity of each memory cell of any block in the at least NV memory element is larger than 1 bit, wherein the controller may selectively configure this block to act as an SLC memory blocks to store one bit in one memory cell or an MLC memory cell to store multiple bits in one memory cell.

Figure 4:
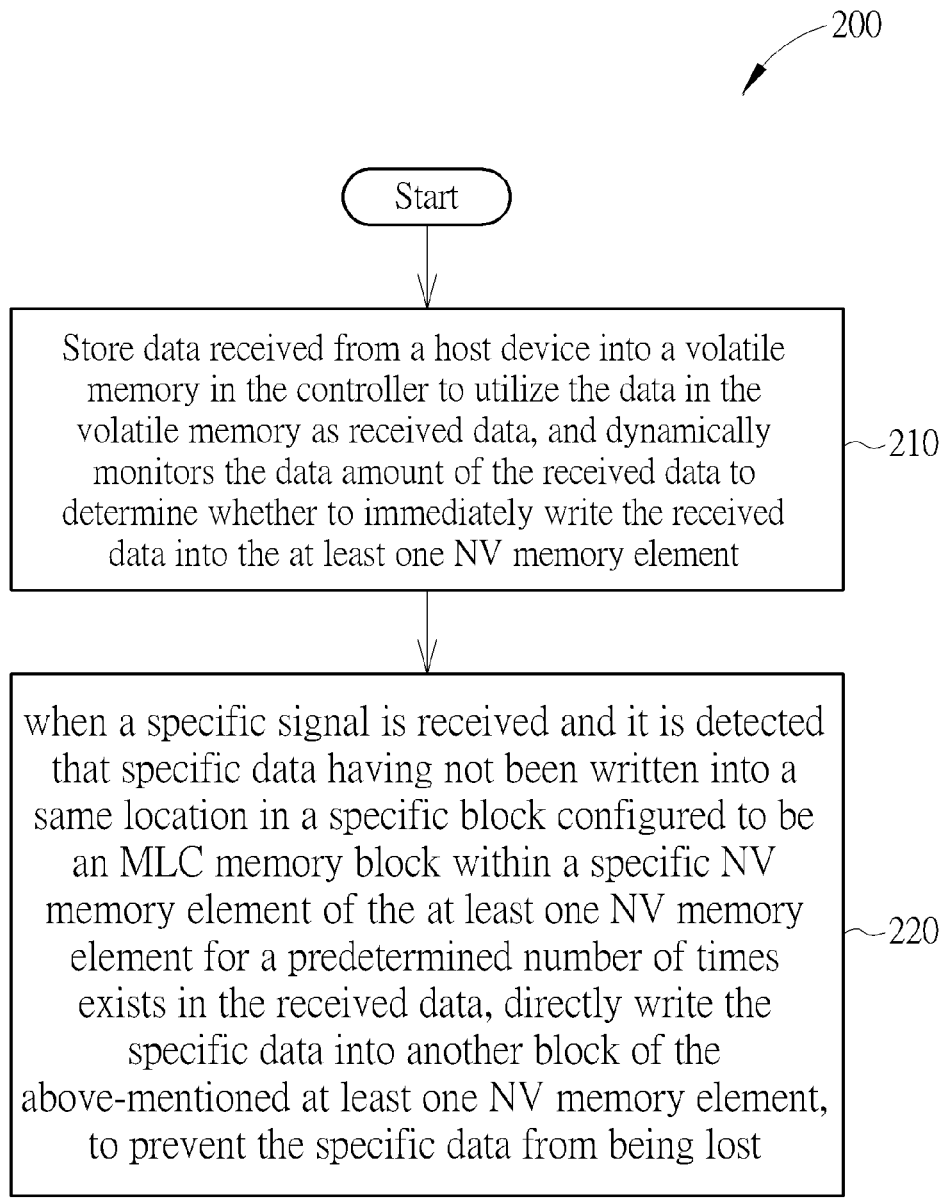
FIG. 4 is a flowchart illustrating a method for managing a memory apparatus according to an embodiment of the present invention.

Please refer to FIG. 4, which is a flowchart illustrating a method 200 for managing a memory apparatus according to an embodiment of the present invention. The method 200 may be applied to the memory apparatus 100 shown in FIG. 1, especially the aforementioned controller (e.g. the memory controller that executes the aforementioned program code through the processing unit 110), wherein the controller that executes the aforementioned program code is used to control the aforementioned at least one NV memory element such as the NV memory elements 140_1, 140_2, ..., 140_N shown in FIG. 1. The method is described as follows.

In step 210, the controller temporarily stores data received from a host device into a volatile memory 120 in the controller to utilize the data in the volatile memory 120 as received data, and dynamically monitors the data amount of the received data to determine whether to immediately write the received data into the at least one NV memory element, wherein at least one write command received from the host device indicates that the host device demands to write the data. For example, when the data amount of partial data of the received data reaches a predetermined data amount threshold PDDA_TH, the controller immediately writes the partial data into the at least one NV memory element, and more particularly, into at least one MLC memory block, instead of temporarily writing the received data into one or more SLC memory blocks in a plenty of SLC memory blocks as described in a related art technique. Hence, the controller does not need to use the aforementioned plenty of SLC memory blocks, thus avoiding the problems in related arts.

Figure 3:
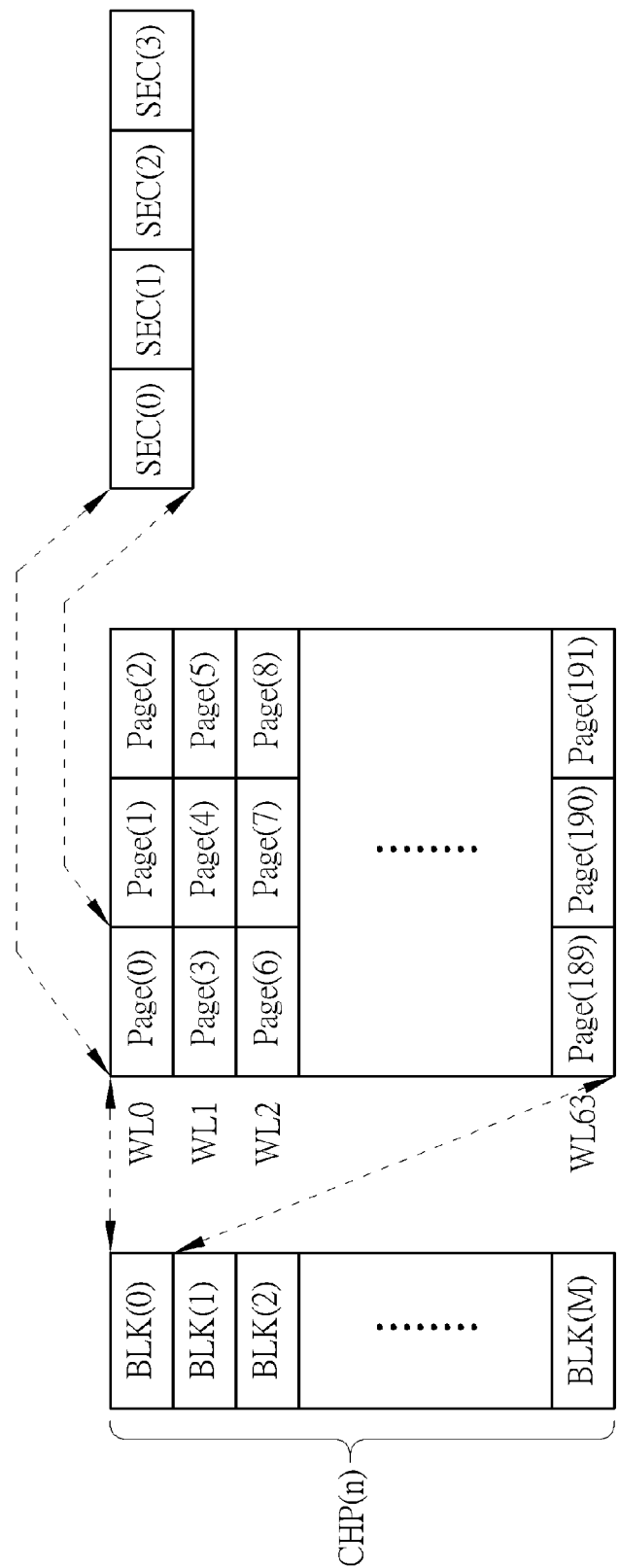
FIG. 3 depicts another content arrangement of one of the NV memory elements, wherein the NV memory element is a flash chip in this embodiment.

In step 220, when a specific signal is received and it is detected that specific data having not been written into a same location in a specific block configured to be an MLC memory block (e.g. the block having 192 pages Page (0), Page (1), ..., Page (192), as shown in FIG. 3) within a specific NV memory element of the at least one NV memory element for a predetermined number of times PDNT_WR exists in the received data, the controller directly writes the specific data into another block of the above-mentioned at least one NV memory element, to prevent the specific data from being lost, wherein the specific signal indicates that power of the controller is abnormal or the memory apparatus 100 is going to be powered off. The predetermined number of times is larger than 1, and the other block is configured as a single level cell (SLC) memory block (e.g. the block having 64 pages Page (0), Page (1), ..., Page (63), as shown in FIG. 2). According to some modifications of this embodiment, the specific signal may include at least one of a power-off command and a power detection signal (e.g. one of the following combinations: the power-off command; the power detection signal; and the power-off command and the power detection signal), wherein the power detection signal is used to indicate at least one of the occurrence of power loss and the occurrence of power down. An example (but not a limitation) of the power-off command includes a "clear cache" command issued from the host device.

In practical, the specific NV memory element may be the flash chip CHP (n) in the embodiment shown in FIG. 3, and the specific block may be one block of the blocks {BLK(0), BLK(1), BLK(2), . . . , BLK(M)} such as the block BLK(m), and the index m may represent any integer in the range [0, M]. Specifically, the other block may be any block other than the specific block, such as the block BLK (m'), and the index m' may represent any possible integer within the range [0, M]. For example, the other block and the specific block may be located in the same flash chip, where the index m' is not equal to the index m. For another example, the other block and the specific block may be located in different chips, where the index m' may be any integer within the range [0, M].

According to this embodiment, under the situation that a memory cell in the specific block is used to store a plurality of bits, the plurality of bits are required to be repeatedly written into the memory cell for a predetermined number of times PDNT_WR, so that the memory cell of the specific NV memory element is correctly programmed, thus making each bit of the plurality of bits correctly stored in the memory cell for further reading. In practice, the storage capacity of the volatile memory 120 is larger than or equal to the product of the predetermined data amount threshold PDDA_TH and the predetermined number of times PDNT_WR (i.e., PDDA_TH*PDNT_WR), to allow at least a portion of the received data to be used in a repeated write operation of the memory cell. For example, regarding some types of MLC flash memories, the specific block is configured as a TLC memory block, the predetermined number of times PDNT_WR may be equal to 3, and the predetermined data amount threshold PDDA_TH may be equal to the storage capacity of a set of memory cells belonging to a word-line in the specific NV memory element. However, this is merely for illustrative purpose, not a limitation to the present invention.

Please note that, in this embodiment, the controller may directly write the received data into the specific block several times, to ensure that the user data is error-free. Specifically, under the control of the controller, the number of times the received data is written into the specific block would reach the predetermined number of times PDNT_WR, so that a specific set of memory cells belonging to a specific word-line in the specific block is correctly programmed in the NV memory element, thus making each bit in the received data correctly stored into the specific set of memory cells for further reading.

According to a modification of this embodiment, the controller receives a plurality of sets of data {Data(0), Data(1), Data(2)}, {Data(3), Data(4), Data(5)}, {Data(6), Data(7), Data(8)}, . . . , respectively, and temporally stores the plurality of sets of data {Data(0), Data(1), Data(2)}, {Data(3), Data(4), Data(5)}, {Data(6), Data(7), Data(8)}, . . . into the volatile memory 120, wherein each of the plurality of sets of data includes a plurality of pages, and the data amount of each of the plurality of sets of data is equal to the predetermined data amount threshold PDDA_TH. Specifically, the controller reads at least one set of the sets of data {Data(0), Data(1), Data(2)}, {Data(3), Data(4), Data(5)}, {Data(6), Data(7), Data(8)} from the volatile memory 120, in order to directly write the above-mentioned at least one set of data into the specific block, wherein the number of times the above-mentioned at least one set of data is written into the specific block does not reach the predetermined number of times PDNT_WR yet, and the specific data described in step 220 includes the above-mentioned at least one set of data. However, this is merely for illustrative purpose, not a limitation to the present invention. According to some modifications of the present invention, the controller reads the sets of data {Data(0), Data(1), Data(2)}, {Data(3), Data(4), Data(5)}, {Data(6), Data(7), Data(8)}, . . . from the volatile memory 120 to directly write the first set of data {Data(0), Data(1), Data(2)} among the plurality of sets of data {Data(0), Data(1), Data(2)}, {Data (3), Data(4), Data(5)}, {Data(6), Data(7), Data(8)} into the specific block several times, wherein the number of times the first set of data {Data(0), Data(1), Data(2)} is written into the specific block reaches the predetermined number of times PDNT_WR, so that a specific set of memory cells belonging to a specific word-line in the specific block is correctly programmed in the specific NV memory element, thus making each bit of the first set of data {Data(0), Data(1), Data(2)} correctly stored in the specific set of memory cells for further reading.

According to some modifications of the present invention, the controller may employ a page-by-page manner to receive at least one page (e.g., one or multiple pages) of at least one set of data among the plurality of sets of data {Data(0), Data(1), Data(2)}, {Data(3), Data(4), Data(5)}, {Data(6), Data(7), Data(8)}, and temporarily store aforementioned at least one page into the volatile memory 120, wherein the specific data includes the aforementioned at least one page of the set of data, and before the total received data amount of the set of data reaches the predetermined data amount threshold PDDR_TH, the set of data is not written into the specific block. When the emergency situation (e.g., the power is abnormal, or the memory apparatus 100 is going to be powered off) informed by the specific signal dismisses, the controller may read the aforementioned at least one page from the other block, and temporarily store the aforementioned at least one page read from the other block into the volatile memory 120 for writing the specific block. In this way, the controller may ensure that the newest information stored in the volatile memory 120 is identical to that stored in the volatile memory at the time the aforementioned emergency situation occurs. Hence, the controller may operate normally regardless the aforementioned emergency situation.

Specifically, under the situation that the set of data has not been completely received (e.g., the data amount of the aforementioned at least one page of the set of data is smaller than the data amount of the set of data), the controller may employ a page-by-page manner to receive at least one other page (e.g., one other page or multiple other pages) of the set of data from the host device, and temporarily store the aforementioned at least one other page of the set of data into the volatile memory 120, until the total received data amount of the set of data reaches the predetermined data amount threshold PDDR_TH (i.e., in these embodiments, the set of data is now completely received), the controller may read at least a portion of the set of data from the volatile memory 120 to directly write the set of data into the specific block.

Further, under the situation that the set of data is completely received (e.g., the data amount of the aforementioned at least one page of the set of data is equal to the data amount of the set of data; or the data amount of the aforementioned at least one page of the set of data is smaller than the data amount of the set of data, and the controller further receives the aforementioned at least one other page of the set of data), the controller may employ a page-by-page manner to receive another set of data among the plurality of sets of data {Data(0), Data(1), Data(2)}, {Data(3), Data(4), Data(5)}, {Data(6), Data(7), Data(8)} from the host device, and temporarily store the other set of data into the volatile memory 120, until the total received data amount of the other set of data reaches the predetermined data amount threshold value PDDA_TH, wherein before the total received data amount of the other set of data reaches the predetermined data amount threshold value PDDR_TH, the other set of data is not written into the specific block. When the total received data amount of the other set of data reaches the predetermined data amount threshold value PDDR_TH, the controller reads at least a portion of the other set of data from the volatile memory 120 to directly write the other set of data into the specific block, and directly writes the set of data into the specific block again. Hence, by directly writing the set of data into the specific block several times, each bit of any page of the set of data is correctly stored into the specific block for further reading.

Figure 5:
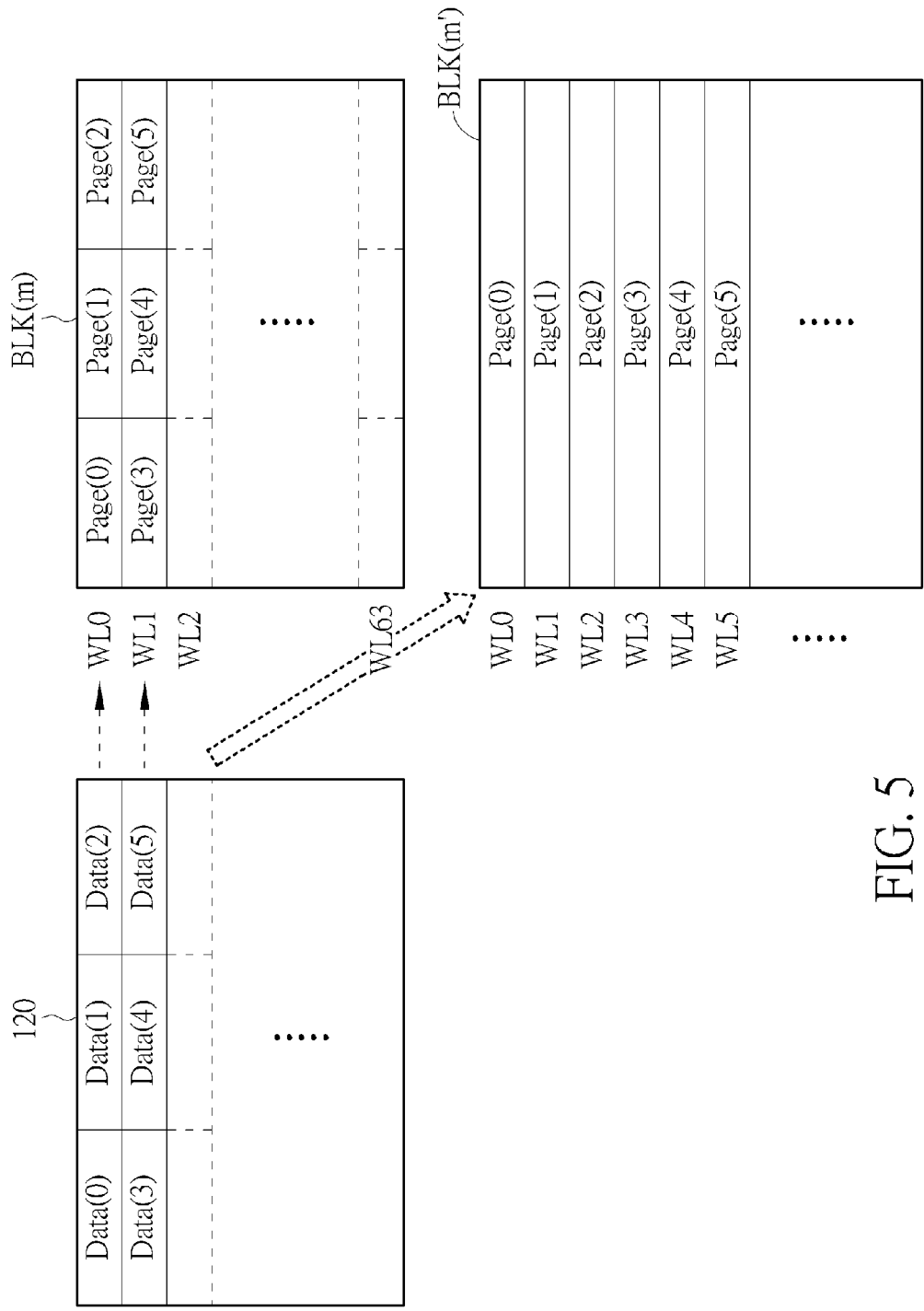
FIG. 5 depicts a control scheme involved by the method shown in FIG. 4 in an embodiment.

Please refer to FIG. 5, which depicts a control scheme involved by the method shown in FIG. 4 in an embodiment, wherein each of the data Data(0), Data(1), Data(2), Data(3), Data(4), Data(5), Data(6), . . . may be one page. For example, the size of one page may be 16 Kilobytes (KB). However, this is merely for illustrative purpose, not a limitation to the present invention.

According to this embodiment, the controller may employ a page-by-page manner to receive the first set of data {Data(0), Data(1), Data(2)}, and temporarily store the first set of data {Data(0), Data(1), Data(2)} into the volatile memory 120, wherein before the total received data amount of the first set of data {Data(0), Data(1), Data(2)} reaches the predetermined data amount threshold PDDA_TH, the first set of data {Data(0), Data(1), Data(2)} is not written into the specific block. In practical, the total received data amount of one set of data (e.g., one of the plurality of sets of data {Data(0), Data(1), Data(2)}, {Data(3), Data(4), Data(5)}, {Data(6), Data(7), Data(8)}) may be the amount of data in this set of data that is already temporarily stored in the volatile memory 120. However, this is merely for illustrative purpose, not a limitation to the present invention. As shown in FIG. 5, when the total received data amount of the first set of data {Data(0), Data(1), Data(2)} reaches the predetermined data amount threshold PDDR_TH, the controller reads at least a portion of the first set of data {Data(0), Data(1), Data(2)} from the volatile memory 120, to directly write the first set of data {Data(0), Data(1), Data(2)} into the specific block such as the block BLM(m). Similarly, the controller performs similar operations upon the second set of data {Data(3), Data(4), Data(5)}.

Please note that, in this embodiment, the specific data includes the first set of data {Data(0), Data(1), Data(2)} and the second set of data {Data(3), Data(4), Data(5)}. When the emergency situation informed by the specific signal occurs, since the number of times the first set of data {Data(0), Data(1), Data(2)} and the second set of data {Data(3), Data(4), Data(5)} are written into the specific block does not reach the predetermined number of times PDNT_WR yet, the controller immediately writes the first set of data {Data(0), Data(1), Data(2)} and the second set of data {Data(3), Data(4), Data(5)} into the other block such as the block BLK(m'), and more particularly, into some pages Page (0), Page (1), Page (2), Page (3), Page (4) and Page (5) in the block BLK(m'), respectively.

Figure 6:
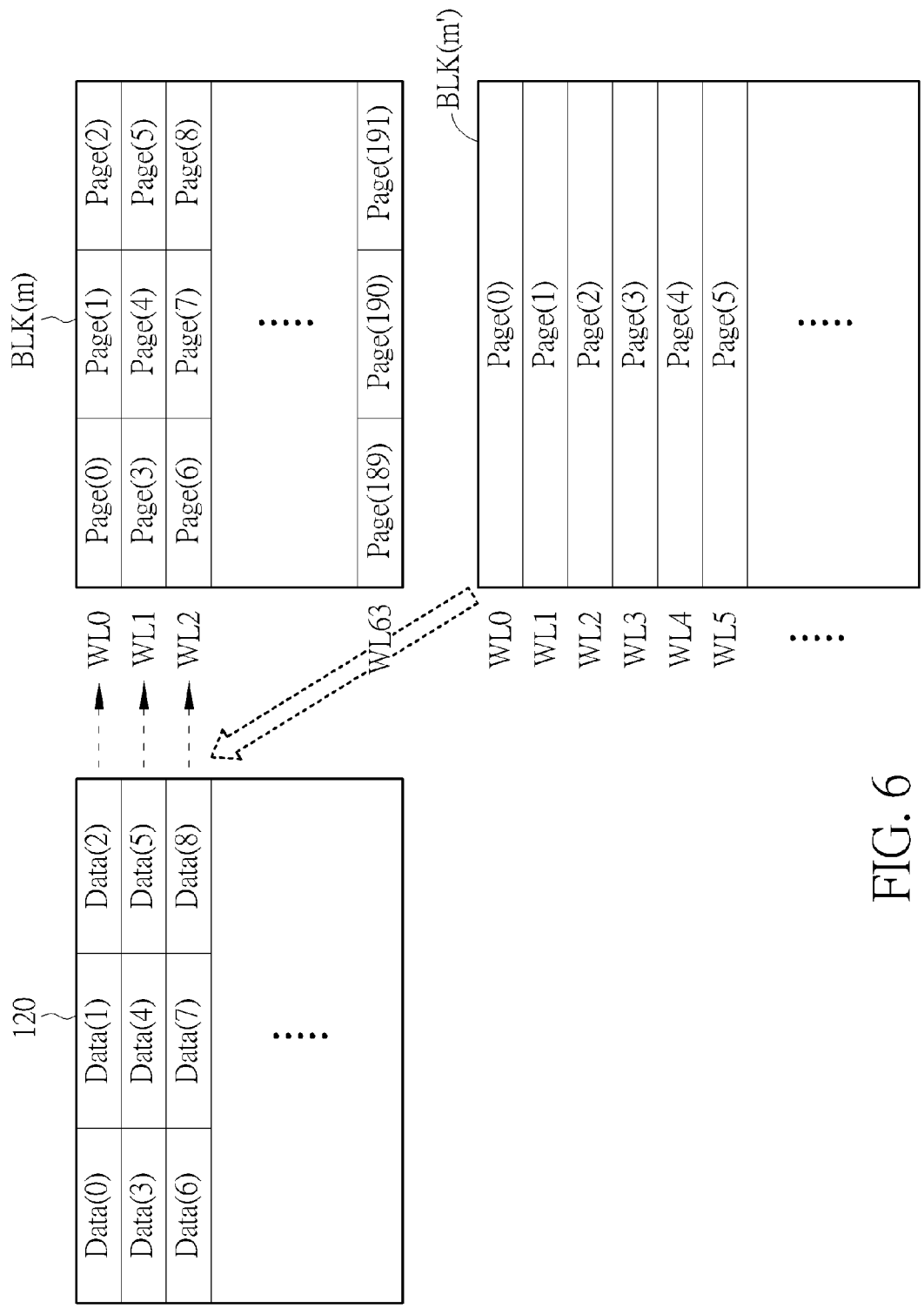
FIG. 6 is a diagram illustrating the control scheme involved by the method shown in FIG. 4 in another embodiment.

Please refer to FIG. 6, which is a diagram illustrating the control scheme involved by the method 200 shown in FIG. 4 in another embodiment, wherein each of the data Data(0), Data(1), Data(2), Data(3), Data(4), Data(5), Data(6), . . . may be one page. For example, the controller has performed the operations in the embodiment of FIG. 5. According to this embodiment, when the emergency situation informed by the specific signal dismisses, the controller reads the first set of data {Data(0), Data(1), Data(2)} and the second set of data {Data(3), Data(4), Data(5)} from the other block, and temporarily stores the first set of data {Data(0), Data(1), Data(2)} and the second set of data {Data(3), Data(4), Data(5)} read from the other block into the volatile memory 120 for writing the specific block.

Figure 7:
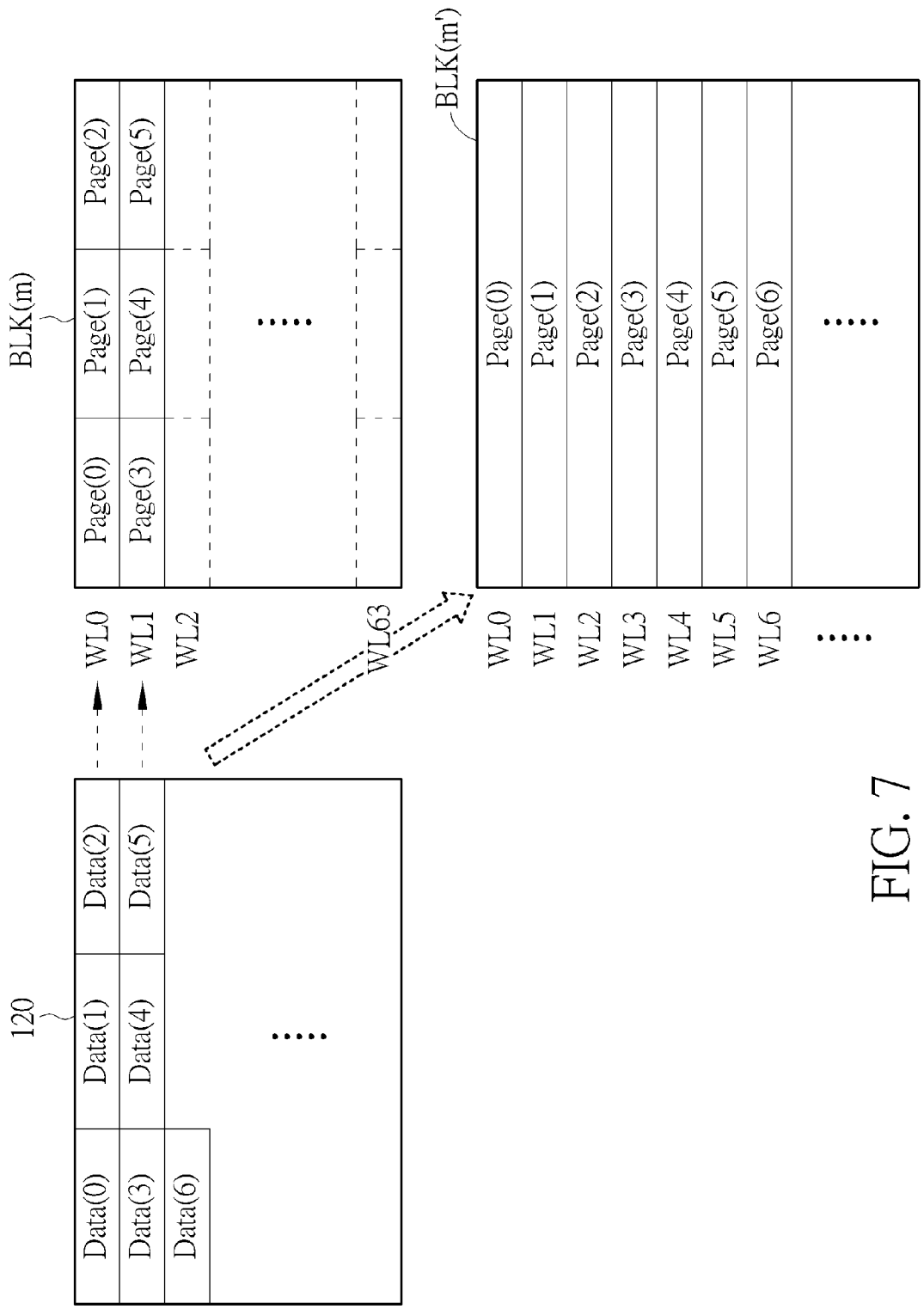
FIG. 7 is a diagram illustrating the control scheme involved by the method shown in FIG. 4 in another embodiment.

Please refer to FIG. 7, which is a diagram illustrating the control scheme involved by the method 200 shown in FIG. 4 in another embodiment. Compared with the embodiment of FIG. 5, the specific data in this embodiment includes the first set of data {Data(0), Data(1), Data(2)}, the second set of data {Data(3), Data(4), Data(5)} and the data Data(6). The Data(6) may be viewed as aforementioned at least one page among the aforementioned set of data, such as aforementioned at least one page in the third set of data {Data(6), Data(7), Data(8)}. The similar parts of this embodiment and previously described embodiments/modifications are omitted here for brevity.

Figure 8:
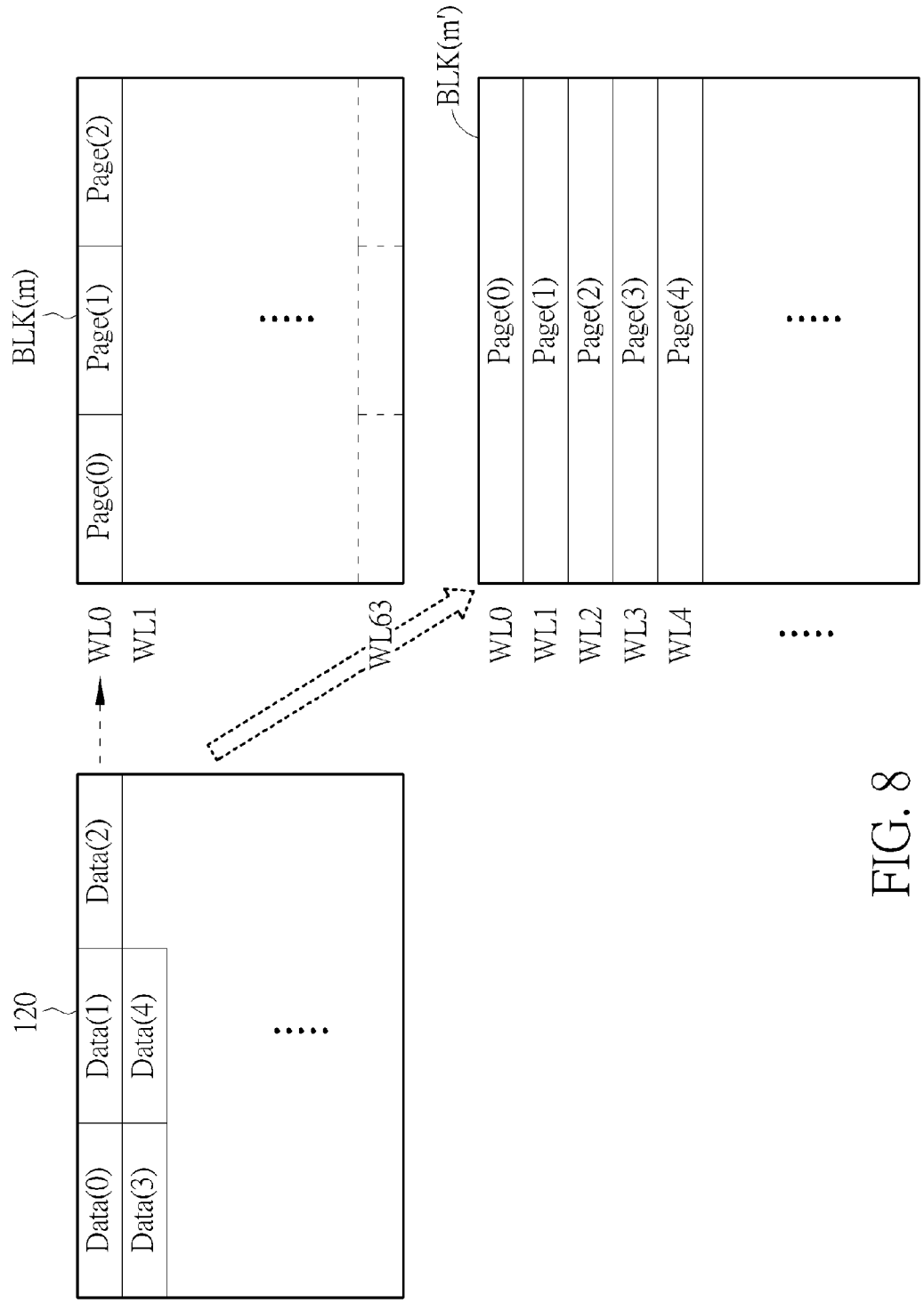
FIG. 8 is a diagram illustrating the control scheme involved by the method shown in FIG. 4 in another embodiment.

Please refer to FIG. 8, which is a diagram illustrating the control scheme involved by the method 200 shown in FIG. 4 in another embodiment. Compared with the embodiment of FIG. 5, the specific data in this embodiment includes the first set of data {Data(0), Data(1), Data(2)} and the data Data(3) and Data(4). The Data(3) and Data(4) may be viewed as aforementioned at least one page among the aforementioned set of data, such as aforementioned at least one page in the second set of data {Data(3), Data(4), Data(5)}. The similar parts of this embodiment and previously described embodiments/modifications are omitted here for brevity.

Figure 9:
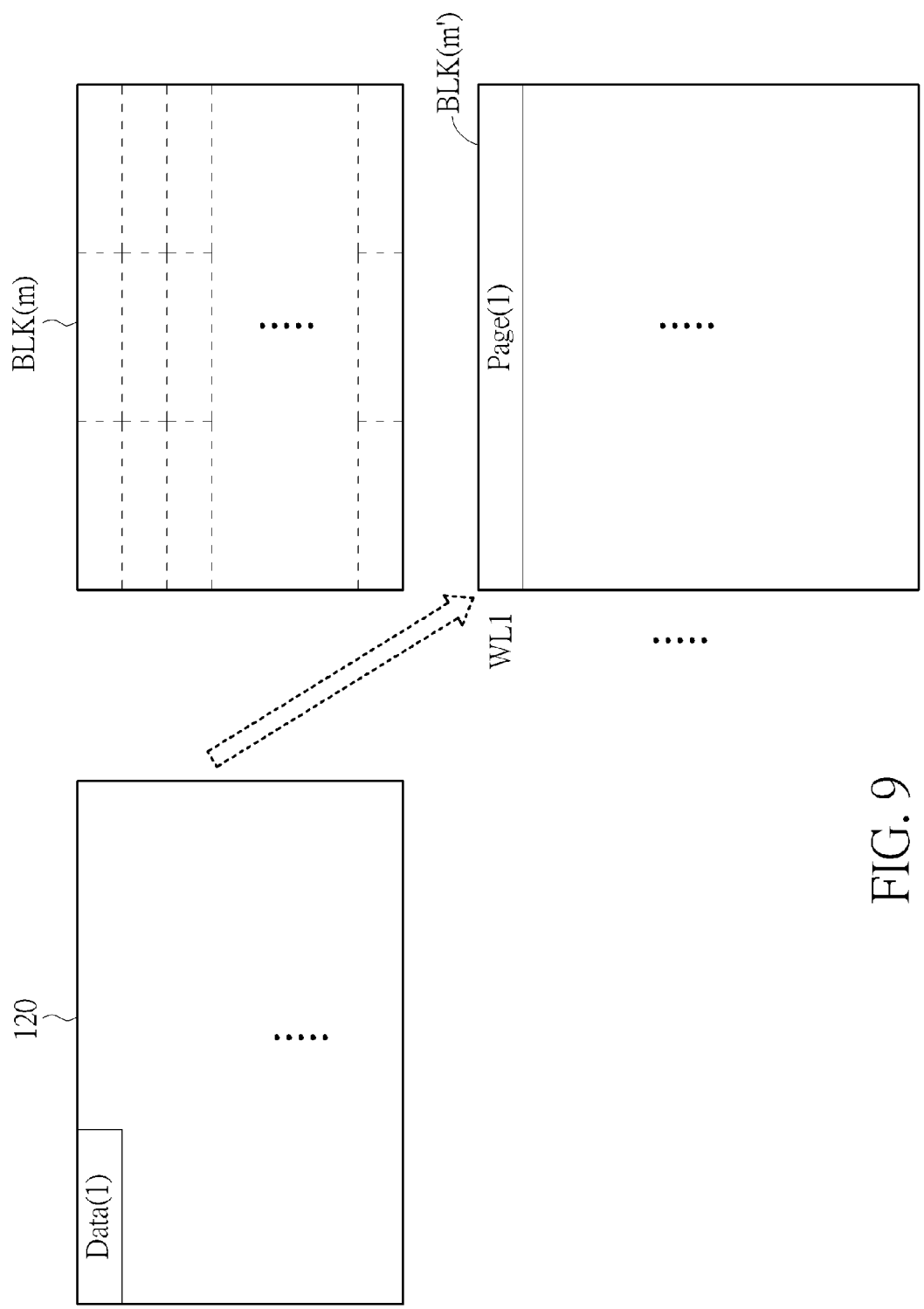
FIG. 9 is a diagram illustrating the control scheme involved by the method shown in FIG. 4 in another embodiment.

Please refer to FIG. 9, which is a diagram illustrating the control scheme involved by the method 200 shown in FIG. 4 in another embodiment. Compared with the embodiment of FIG. 5, the specific data in this embodiment includes the data Data(0). The Data(0) may be viewed as aforementioned at least one page among the aforementioned set of data, such as aforementioned at least one page in the first set of data {Data(0), Data(1), Data(2)}. The similar parts of this embodiment and previously described embodiments/modifications are omitted here for brevity.

Figure 10:
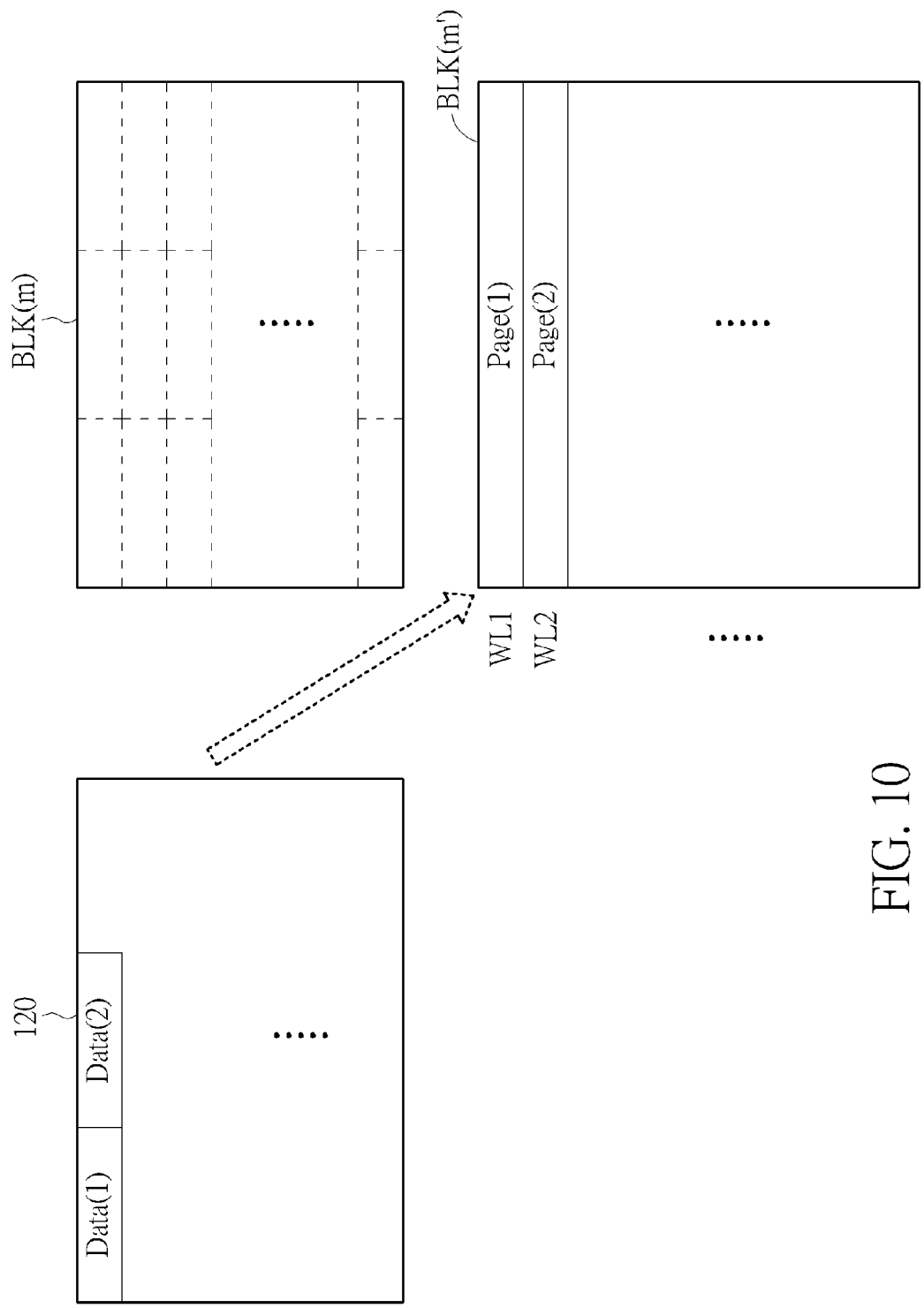
FIG. 10 is a diagram illustrating the control scheme involved by the method shown in FIG. 4 in another embodiment.

Please refer to FIG. 10, which is a diagram illustrating the control scheme involved by the method 200 shown in FIG. 4 in another embodiment. Compared with the embodiment of FIG. 5, the specific data in this embodiment includes the data Data(0) and Data(1). The Data(0) and Data(1) can be viewed as aforementioned at least one page among the aforementioned set of data, such as aforementioned at least one page in the first set of data {Data(0), Data(1), Data(2)}. The similar parts of this embodiment and previously described embodiments/modifications are omitted here for brevity.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for managing a memory apparatus, the memory apparatus comprising at least one non-volatile (NV) memory element, each of the at least one NV memory element comprising a plurality of blocks, the method being applied to a controller of the memory apparatus, the controller arranged to control the at least one NV memory element, the method comprising following steps:

temporarily storing data received from a host device into a volatile memory in the controller and utilizing the data in the volatile memory as received data, and dynamically monitoring a data amount of the received data to determine whether to immediately write the received data into the at least one NV memory element, wherein at least one write command received from the host device indicates that the host device demands to write the data; and when a specific signal is received and it is detected that specific data having been written into a same location in a specific block configured to be a multiple level cell (MLC) memory block within a specific NV memory element of the at least one NV memory element for at least once but less than a predetermined number of times exists in the received data, immediately writing the specific data into another block in the at least one NV memory element, to prevent the specific data from being lost, wherein the specific signal indicates that power of the controller is abnormal or the memory apparatus is going to be powered off, the predetermined number of times is larger than one, and the other block is configured as a single level cell (SLC) memory block.

2. The method of claim 1, wherein under a situation that a memory cell in the specific block is used to store a plurality of bits, the plurality of bits need to be repeatedly written into the memory cell for the predetermined number of times, so that the memory cell is correctly programmed in the specific NV memory element, thus making each of the plurality of bits correctly stored into the memory cell for further reading.

3. The method of claim 2, further comprising:
when a data amount of partial data of the received data reaches a predetermined data amount threshold, immediately writing the partial data into the at least one NV memory element;
wherein a storage capacity of the volatile memory is larger than or equal to a product of the predetermined data amount threshold and the predetermined number of times, to allow at least a portion of the received data to be used in a repeated write operation of the memory cell.

4. The method of claim 3, wherein the predetermined data amount threshold is equal to a storage capacity of a set of memory cells belonging to a word-line in the specific NV memory element.

5. The method of claim 4, wherein any of the plurality of blocks comprises a predetermined number of pages; and the method further comprises:
receiving a plurality of sets of data from the host device, respectively, and temporarily storing the plurality of sets of data into the volatile memory, wherein each of the plurality of sets of data comprises a plurality of pages, and a data amount of each of the plurality of sets of data is equal to the predetermined data amount threshold; and
reading at least one set of data in the plurality of sets of data from the volatile memory, to directly write the at least one set of data into the specific block, wherein a number of times the at least one set of data is written into the specific block does not reach the predetermined number of times yet;
wherein the specific data comprises the at least one set of data.

6. The method of claim 2, wherein any of the plurality of blocks comprises a predetermined number of pages; and the method further comprises:
respectively receiving at least one page of a set of data comprising a plurality of pages from the host device in a page-by-page manner, and temporarily storing the at least one page of the set of data into the volatile memory, wherein the specific data comprises the at least one page of the set of data, and before a total received data amount of the set of data reaches the predetermined data amount threshold, the set of data is not written into the specific block; and
reading the at least one page of the set of data from the other block, and temporarily storing the at least one page read from the other block into the volatile memory, for writing the specific block.

7. The method of claim 6, further comprising:
respectively receiving one other page of the set of data from the host device in a page-by-page manner, and temporarily storing the at least one other page into the volatile memory; and
when the total received data amount of the set of data reaches the predetermined data amount threshold, reading at least a portion of the set of data from the volatile memory to directly write the set of data into the specific block, and directly writing the first set of data into the specific block for a second time.

8. The method of claim 6, further comprising:
respectively receiving another set of data comprising a plurality of pages from the host device in a page-by-page manner, and temporarily storing the other set of data into the volatile memory, until a total received data amount of the other set of data reaches the predetermined data amount threshold, wherein before the total received data amount of the other set of data reaches the predetermined data amount threshold, the other set of data is not written into the specific block; and
when the total received data amount of the other set of data reaches the predetermined data amount threshold, reading at least a portion of the other set of data from the volatile memory to directly write the other set of data into the specific block, and directly writing the set of data into the specific block again;
wherein by directly writing the set of data into the specific block several times, each bit of data of any page of the set of data is correctly stored into the specific block for further reading.

9. The method of claim 1, wherein the specific signal comprises at least one of a power-off command and a power detection signal, where the power detection signal is used to indicate at least one of occurrence of power loss and occurrence of power down.

10. The method of claim 1, wherein a storage capacity of each memory cell of any block in the at least NV memory element is larger than one bit.

11. A memory apparatus, comprising:
at least one non-volatile (NV) memory element, each comprising a plurality of blocks; and a controller, arranged to control the at least one NV element, the controller comprising a processing unit arranged to manage the memory apparatus according to a program code embedded in the processing unit or received from outside of the processing unit, wherein the controller temporarily stores data received from a host device into a volatile memory in the controller and utilizes the data in the volatile memory as received data, and dynamically monitors a data amount of the received data to determine whether to immediately write the received data into the at least one NV memory element, wherein at least one write command received from the host device indicates that the host device demands to write the data;

wherein when a specific signal is received and it is detected that specific data having been written into a same location in a specific block configured to be a multiple level cell (MLC) memory block within a specific NV memory element of the at least one NV memory element for at least once but less than a predetermined number of times exists in the received data, the controller immediately writes the specific data into another block in the at least one NV memory element, to prevent the specific data from being lost, wherein the specific signal indicates that power of the controller is abnormal or the memory apparatus is going to be powered off, the predetermined number of times is larger than one, and the other block is configured as a single level cell (SLC) memory block.

12. The memory apparatus of claim 11, wherein under a situation that a memory cell in the specific block is used to store a plurality of bits, the plurality of bits need to be repeatedly written into the memory cell for the predetermined number of times, so that the memory cell is correctly programmed in the specific NV memory element, thus making each of the plurality of bits correctly stored into the memory cell for further reading.

13. The memory apparatus of claim 12, wherein when a data amount of partial data of the received data reaches a predetermined data amount threshold, the controller immediately writes the partial data into the at least one NV memory element; and a storage capacity of the volatile memory is larger than or equal to a product of the predetermined data amount threshold and the predetermined number of times, to allow at least a portion of the received data to be used in a repeated write operation of the memory cell.

14. The memory apparatus of claim 13, wherein the predetermined data amount threshold is equal to a storage capacity of a set of memory cells belonging to a word-line in the specific NV memory element.

15. The memory apparatus of claim 14, wherein any of the plurality of blocks comprises a predetermined number of pages; the controller receives a plurality of sets of data from the host device, respectively, and temporarily stores the plurality of sets of data into the volatile memory, wherein each of the plurality of sets of data comprises a plurality of pages, and a data amount of each of the plurality of sets of data is equal to the predetermined data amount threshold; the controller reads at least one set of data from the volatile memory to directly write the at least one set of data into the specific block, wherein a number of times the at least one set of data is written into the specific block does not reach the predetermined number of times yet; and the specific data comprises the at least one set of data.

16. A controller of a memory apparatus, the memory apparatus comprising at least one non-volatile (NV) memory element, each of the at least one NV memory element comprising a plurality of blocks, the controller comprising:

a processing unit, arranged to manage the memory apparatus according to a program code embedded in the processing unit or received from outside of the processing unit, wherein the controller temporarily stores data received from a host device into a volatile memory in the controller and utilizes the data in the volatile memory as received data, and dynamically monitors a data amount of the received data to determine whether to immediately write the received data into the at least one NV memory element, wherein at least one write command received from the host device indicates that the host device demands to write the data; and wherein when a specific signal is received and it is detected that specific data having been written into a same location in a specific block configured to be a multiple level cell (MLC) memory block within a specific NV memory element of the at least one NV memory element for at least once but less than a predetermined number of times exists in the received data, the controller immediately writes the specific data into another block in the at least one NV memory element, to prevent the specific data from being lost, wherein the specific signal indicates that power of the controller is abnormal or the memory apparatus is going to be powered off, the predetermined number of times is larger than one, and the other block is configured as a single level cell (SLC) memory block.

17. The controller of claim 16, wherein under a situation that a memory cell in the specific block is used to store a plurality of bits, the plurality of bits need to be repeatedly written into the memory cell for the predetermined number of times, so that the memory cell is correctly programmed in the specific NV memory element, thus making each of the plurality of bits correctly stored into the memory cell for further reading.

18. The controller of claim 17, wherein when a data amount of partial data of the received data reaches a predetermined data amount threshold, the controller immediately writes the received data into the at least one NV memory element; and a storage capacity of the volatile memory is larger than or equal to a product of the predetermined data amount threshold and the predetermined number of times, to allow at least a portion of the received data to be used in a repeated write operation of the memory cell.

19. The controller of claim 18, wherein the predetermined data amount threshold is equal to a storage capacity of a set of memory cells belonging to a word-line in the specific NV memory element.

20. The controller of claim 19, wherein any of the plurality of blocks comprises a predetermined number of pages; the controller receives a plurality of sets of data from the host device, respectively, and temporarily stores the plurality of sets of data into the volatile memory, wherein each of the plurality of sets of data comprises a plurality of pages, and a data amount of each of the plurality of sets of data is equal to the predetermined data amount threshold; the controller reads at least one set of data of the plurality of sets of data from the volatile memory, to directly write the at least one set of data into the specific block, wherein a number of times the at least one set of data is written into the specific block does not reach the predetermined number of times yet; and the specific data comprises the at least one set of data.

* * * * *